E. H. COX.
DEVICE FOR TESTING WELLS FOR OIL, GAS, &c.
APPLICATION FILED JUNE 24, 1920.
1,347,534.
Patented July 27, 1920.
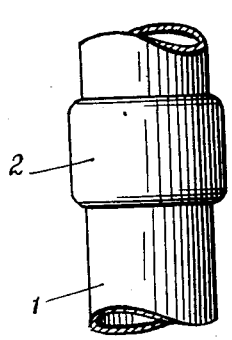
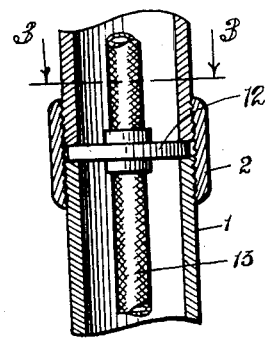
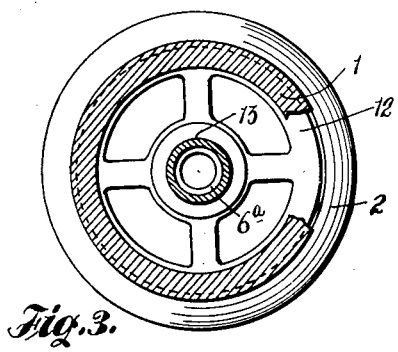
Fig. 3.
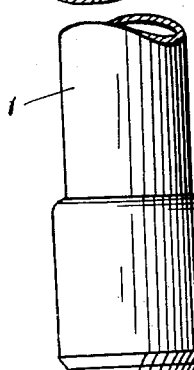
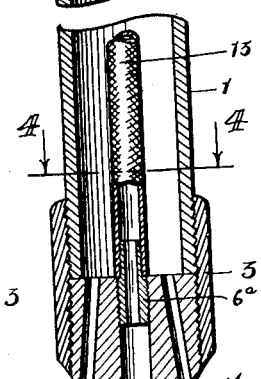
Fig. 4.
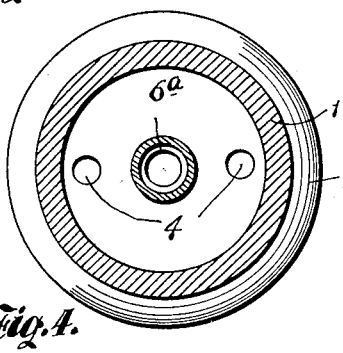
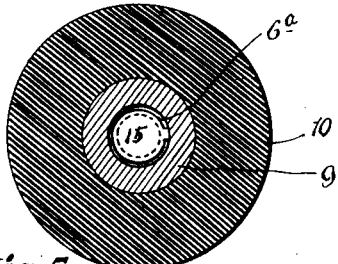
Fig. 5.
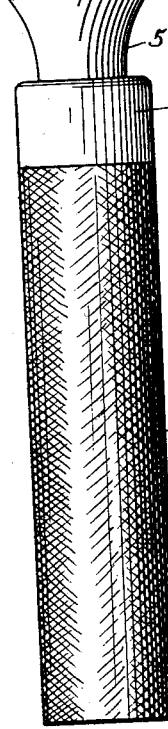
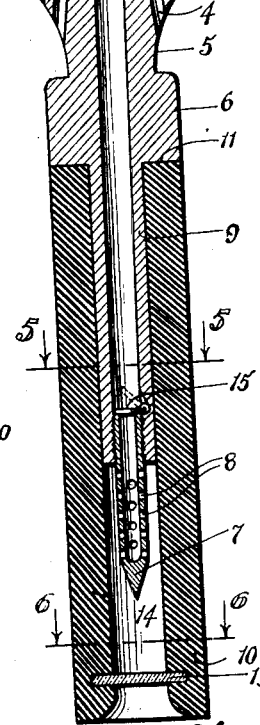
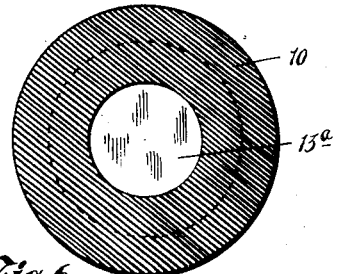
Fig. 6.
Fig. 1.
Fig. 2.
INVENTOR.
Ernest H. Cox
BY J. W. Chancellor
ATTORNEYS.

UNITED STATES PATENT OFFICE.

ERNEST H. COX, OF DUNCAN, OKLAHOMA, ASSIGNOR OF ONE-HALF TO J. W. CHANCELLOR, OF BOWIE, TEXAS.

DEVICE FOR TESTING WELLS FOR OIL, GAS, &c.

1,347,534. Specification of Letters Patent. Patented July 27, 1920.

Application filed June 24, 1920. Serial No. 391,302.

*To all whom it may concern:*

Be it known that I, ERNEST H. COX, a citizen of the United States, residing at Duncan, in the county of Stephens and State of Oklahoma, have invented certain new and useful Improvements in Devices for Testing Wells for Oil, Gas, &c., of which the following is a specification.

This invention relates to improvements in well drilling, particularly to wells drilled by the rotary system, and in such connection it relates more particularly to a device for testing wells in order to ascertain if oil, water, gas, and other liquids are under the path of the drill or in proximity thereto, that is the stratum which has not been disturbed or only partially disturbed by the drill bit; to provide means for procuring and bringing to the surface a small quantity or sampling test of such oil, sand, water or whatever is in the path of the drill bit for inspection and analysis, and to also provide an efficient and satisfactory means for complete separation of the water, mud, slush, etc., in the hole above the point from which the test is to be taken from the quantity to be investigated and analyzed, to thereby arrive at an accurate determination of the value of the drilled hole.

Such contrivances as are now in use so far as I am aware are mainly intended to ascertain the whereabouts or quality, etc., of any gas, oil, or water, which may reside in the bottom of the drilled hole and crude attempts have been made in ascertaining such information to separate the water and slush in the drill casing or hole from the liquid, gas or what not which may reside in the well, to bring it in its uncontaminated state to the surface.

My invention will be more fully understood from the following description, taken in connection with the accompanying drawings, forming part hereof, in which—

Figure 1 is a vertical elevational view of the lower end of a drill stem embodying my invention.

Fig. 2 is a longitudinal sectional view thereof, and

Figs. 3, 4, 5 and 6 are cross sectional views, respectively, taken on lines 3, 4, 5 and 6, of Fig. 2.

Referring more particularly to the drawings, 1 denotes a section of a drill stem with the usual couplings 2, the drill stem shown in broken formation for better illustration.

The lower end of the drill stem 1 is threaded to receive the device for making the test. This device has a head 3 screw-threaded onto the lower end of the drill stem 1 and the head 3 is channeled or bored as at 4—4 to provide a passage for water, slush, etc., when the drill stem is lowered into the well, the channels having an oblique relationship to the drill stem as depicted in Fig. 2. The head 3 has a curved neck 5, the head 3 and neck 5 being formed integrally with the body 6. The body 6 is longitudinally channeled as illustrated at Fig. 2 and on the lower end is a sharp pointed plunger 7 for piercing the formation at the bottom of the hole. The sharp pointed plunger 7 is perforated as at 8—8 so that liquid, gas, etc., may enter. The lower portion of the device has its diameter reduced into an extended nipple-like member 9 around which is stretched or placed a rubber nose 10 and which nose abuts a shoulder 11.

Between adjacent ends of the drill stem sections 1 is interposed a ring 12 or centralizing means for a flexible metallic hose 13. The hose 13 is screwed onto the upper end of the nipple $6^a$. The rubber nose 10 as will be noted by reference to Fig. 2 extends beyond the lower end of the nipple-like member 9 and its opening 14 is closed preferably by a piece of glass or brittle material $13^a$.

In operation the drill stem carrying the device is lowered into the hole to within a short distance of the bottom where it is then dropped at sufficient speed to cause the nose 10 to forcibly strike the bottom of the hole. On such impact the sharp pointed member 7 is forced downward and on breaking the closure $13^a$ is plunged into the bottom of the hole. The impact of the heavy drill stem will also cause the rubber nose 10 to be forced against the walls of the well and effectually shut off the water and slush in the hole from the opening 14. As the liquid enters this opening it passes through the perforations 8—8 into the hollow interior of the sharp pointed member 7 and flows upward and is held in the flexible hose 13 by a check valve 15 of any suitable construction. The drill stem may then be removed from the hole for inspection of the test.

It is obvious that on striking gas that the gas will pass upward through the member 7 and into the metallic hose 13 to the top of the well without the necessity of removing the drill stem from the well. Also that minor changes may be made in the construction of the device without departing from the principle or spirit of the invention.

Having thus described the nature and objects of my invention, what I claim as new and desire to secure by Letters Patent is—

1. In a device of the character described, a substantially cylindrical member adapted to be attached to the lower end of a drill stem, said member having a head and a neck and body, said head and neck provided with a plurality of channels traversing the head and neck in oblique relationship to the body, and opening outward and downward at the neck of the body to admit water, slush, etc., when the drill stem is lowered into the well, the lower end of the body reduced in diameter and extended into a nipple-like formation, a "packer" or nose thereon, a channel through the head and nipple-like formation, a plunger with a pointed perforated end extending from the lower end thereof, a flexible tube connected to the head and a closure over the bottom of the nose.

2. In a device of the character described, a substantially cylindrical body with a head and neck for connection to a drill stem, oblique channels traversing the head and neck, said body reduced in diameter below the neck into a relatively long nipple or shank, a channel through the shank and extending through the head and neck, a perforated plunger with a check valve, a flexible hose connected thereto, a nose or "packer" receivable on the shank, and a closure on the bottom of the "packer" or nose, all arranged so that on impact in the hole the "packer" or nose will expand against the walls of the well, the plunger will pierce or break the closure and allow the fluid or gas to pass into the plunger and flexible hose.

In testimony whereof I have signed my name to this specification.

ERNEST H. COX.